United States Patent
Huaulme et al.

(10) Patent No.: US 10,730,363 B2
(45) Date of Patent: Aug. 4, 2020

(54) AIR CONDITIONING SYSTEM FOR AN ELECTRIC TRANSPORT VEHICLE

(71) Applicant: FAIVELEY TRANSPORT TOURS, Saint-Pierre-des-Corps (FR)

(72) Inventors: Patrice Huaulme, Tours (FR); Philippe Aubin, Chanceaux sur Choisille (FR); Domenico Palmisano, Marcq en Baroeul (FR)

(73) Assignee: FAIVELEY TRANSPORT TOURS, Saint-Pierre-des-Corps (FR)

( * ) Notice: Subject to any disclaimer, the term of this patent is extended or adjusted under 35 U.S.C. 154(b) by 150 days.

(21) Appl. No.: 15/599,574

(22) Filed: May 19, 2017

(65) Prior Publication Data
US 2017/0334264 A1    Nov. 23, 2017

(30) Foreign Application Priority Data

May 20, 2016 (FR) .................................. 16 54510

(51) Int. Cl.
*B60H 1/00* (2006.01)
*B60L 1/02* (2006.01)
(Continued)

(52) U.S. Cl.
CPC ..... *B60H 1/00392* (2013.01); *B60H 1/00428* (2013.01); *B60H 1/00778* (2013.01);
(Continued)

(58) Field of Classification Search
CPC ............ B61D 27/0018; B60H 1/00357; B60H 1/00385; B60H 1/00392; B60H 1/00764
See application file for complete search history.

(56) References Cited

U.S. PATENT DOCUMENTS

| | | |
|---|---|---|
| 2015/0191090 A1 | 7/2015 | Sawa et al. |
| 2016/0075350 A1* | 3/2016 | Becker ................... B60L 1/003 701/19 |
| 2016/0264077 A1* | 9/2016 | Abousleiman .......... B60L 1/003 |

FOREIGN PATENT DOCUMENTS

DE        44 16 107 A1    11/1995

OTHER PUBLICATIONS

Merriam Webster's Dictionary definition of "amplitude".*
French Search Report, dated Jan. 18, 2017, from corresponding FR application.

* cited by examiner

*Primary Examiner* — Marc E Norman
*Assistant Examiner* — Schyler S Sanks
(74) *Attorney, Agent, or Firm* — Christopher R. Carroll; The Small Patent Law Group LLC (57) ABSTRACT

An air conditioning system for an electric transport vehicle supplied by an electrical supply network includes at least one actuator for the production of heat or cold, and a regulator configured in order to generate at least one operating command applied to the at least one actuator as a function of values for parameters representing the climatic conditions, the actuator delivering an average power over a predetermined time period. The regulator are configured in order to generate at least one operating command applied to at least one actuator as a function moreover of the value for a parameter relating to at least one electric transport vehicle supplied by the electrical supply network, the value for the parameter indicating that electrical energy is consumed by the at least one electric transport vehicle or that electrical energy is produced by the at least one electric vehicle.

25 Claims, 4 Drawing Sheets

(51) Int. Cl.
  *B60L 7/10*   (2006.01)
  *B60L 9/00*   (2019.01)
  *B60H 1/32*   (2006.01)
  *B60L 1/00*   (2006.01)

(52) U.S. Cl.
  CPC ....... *B60H 1/00878* (2013.01); *B60H 1/3208* (2013.01); *B60L 1/003* (2013.01); *B60L 1/02* (2013.01); *B60L 7/10* (2013.01); *B60L 9/00* (2013.01); *B60H 1/00357* (2013.01); *B60H 1/00385* (2013.01); *B60H 1/00421* (2013.01); *B60H 1/00735* (2013.01); *B60H 1/00764* (2013.01); *B60H 1/00814* (2013.01); *B60H 1/32* (2013.01); *B60H 1/3204* (2013.01); *B60H 1/3205* (2013.01); *B60H 2001/327* (2013.01); *B60H 2001/3266* (2013.01); *B60H 2001/3292* (2013.01); *B60L 2200/26* (2013.01); *B60L 2200/28* (2013.01); *B60L 2240/28* (2013.01); *B60L 2240/34* (2013.01)

AIR CONDITIONING SYSTEM FOR AN ELECTRIC TRANSPORT VEHICLE

BACKGROUND OF THE INVENTION

Field of the Invention

The present invention relates to an air conditioning system for an electric transport vehicle.

The invention relates in particular to urban electric transport vehicles, as these vehicles have frequent stops and as a result have short traction and braking phases.

Description of the Related Art

As electric transport networks are increasingly busy, the power networks supplying the vehicles can prove to be short of capacity during rush hours. It is therefore necessary to reduce the energy consumption in electric transport networks, in particular the consumption peaks.

Some items of equipment such as air conditioning systems consume a significant amount of electrical energy.

An air conditioning system comprises a set of actuators and is configured in order to maintain climatic conditions in a passenger compartment.

Generally, the actuators comprise among others, a compressor, a fan and heating means such as resistances. It will be noted that the actuators for producing heat or cold are actuators that consume significant amounts of electrical energy.

Climatic conditions are represented by a set of parameters, such as temperature, humidity or air pollution.

Thus, the air conditioning system is configured in order to maintain the parameters representing the climatic conditions at predetermined values. For example, they are configured in order to maintain the temperature of the passenger compartment at a predetermined temperature or set temperature.

So as to maintain the parameters representing the climatic conditions at predetermined values, the air conditioning system comprises regulating means that are configured in order to generate commands for operating the actuators as a function of a set of parameters representing climatic conditions in the interior and on the exterior of the passenger compartment.

For example, regulating the temperature at a predetermined temperature value is implemented as a function of the temperature in the interior and on the exterior of the passenger compartment.

It will be noted that in the interior of a passenger compartment, the $CO_2$ level is linked to the number of people present in the passenger compartment. Thus, in conventional air conditioning systems, the air renewal system must be dimensioned so that the air is renewed when the passenger compartment has a maximum occupancy level.

In a manner known in some air conditioning systems, the $CO_2$ level in the interior of the passenger compartment can also be taken into account so as to regulate the rate of air renewal in the interior of the passenger compartment and thus reduce the energy consumption of the air conditioning system, in particular when the occupancy level of the passenger compartment is low.

Thus, as a function of the parameters such as the temperature in the interior or on the exterior of the passenger compartment and optionally $CO_2$ levels in the air of the passenger compartment, means for regulating the air conditioning system generate operating commands applied to the different actuators constituting the air conditioning system.

These operating commands are such that the actuators deliver an average power over a predetermined time period.

In order to reduce the electrical energy consumption in an electric transport vehicle, solutions exist consisting of recovering electrical energy in certain phases of the operation or modes of movement of the vehicle, to be used later in other phases of operation or modes of movement, in the same vehicle from which the energy is recovered or in another vehicle supplied by the same electrical supply network.

During the braking phases of electric vehicles that are not equipped with energy recovery devices, rheostats connected to the motors of the vehicle dissipate the electrical energy generated by the motors of the vehicle in the form of heat.

Thus, during this phase of operation, the electrical energy is recovered instead of being dissipated in the rheostats.

For example, the energy recovered in the braking phases is used in the traction phases of the same vehicle from which the energy is recovered or in traction phases of another vehicle supplied by the same electrical supply network.

According to energy recovery techniques, the air conditioning systems of a vehicle can be supplied by energy recovered during the braking phases of this same vehicle or of another vehicle supplied by the same electrical supply network.

SUMMARY OF THE INVENTION

The purpose of the present invention is to improve the techniques for reducing energy consumption, so as to reduce the energy consumption peaks of an air conditioning system in an electric transport vehicle.

To this end, according to a first aspect, the present invention relates to an air conditioning system for an electric transport vehicle supplied by an electrical supply network, the air conditioning system comprising at least one actuator producing heat or cold, and regulating means configured in order to generate at least one operating command applied to said at least one actuator as a function of values for parameters representing the climatic conditions, said at least one actuator delivering an average power over a predetermined time period.

According to the invention, the regulating means are configured in order to generate said at least one operating command applied to said at least one actuator as a function moreover of the value for a parameter relating to at least one electric transport vehicle supplied by the electrical supply network, the value for the parameter indicating that electrical energy is consumed by said at least one electric transport vehicle, or that electrical energy is produced by said at least one electric vehicle, said at least one operating command being generated such that the average power delivered by the at least one actuator over the predetermined time period has substantially the same value as when the regulating means only take into account the parameters representing the climatic conditions.

Thus, the regulating means take into account the climatic conditions, as well as at least one parameter relating to at least one electric transport vehicle for generating commands for operating the actuators of the air conditioning system of a vehicle.

It will be noted that the regulating means can take into account at least one parameter relating to the electric transport vehicle in which the air conditioning system is installed or relating to another electric transport vehicle supplied by the electrical supply network.

Thus, by means of these features, the operating commands are generated taking into account, in addition to values for parameters representing the climatic conditions, the value for the parameter relating to at least one electric transport vehicle, without thereby modifying the value of the average power delivered by said at least one actuator over the predetermined time period, with respect to the average power delivered by the actuator when only the values for the parameters representing the climatic conditions are taken into account.

The regulating means thus operate so as to maintain predefined climatic conditions, i.e. to maintain the value for the parameters representing the climatic conditions at predefined values, while taking into account at least one parameter relating to an electric transport vehicle.

This makes it possible to regulate the climatic conditions in a vehicle while reducing the peaks of electrical energy consumption. Thus, the electrical energy consumption is optimized.

According to a feature, over the predetermined time period said at least one operating command is generated such that if during a first period A in which the value for said at least one parameter indicates that the electrical energy is consumed by said at least one electric transport vehicle, the average power delivered by said at least one actuator during the first period A is less than the value of the average power during the predetermined time period when only the parameters representing the climatic conditions are taken into account for the generation of said at least one operating command.

It will be noted that in the electric transport vehicles equipped with a device for the recovery of braking energy, when the parameter indicates that the electrical energy is consumed, the electric transport vehicle is for example in a traction phase. Thus, during the first period A, the power delivered by said at least one actuator is reduced with respect to the value of the average power during the predetermined time period when only the parameters representing the climatic conditions are taken into account.

According to another feature, over the predetermined time period said at least one operating command is generated such that if during a second period B the value for said at least one parameter indicates that electrical energy is produced by said at least one electric transport vehicle, the average power delivered by said at least one actuator during said second period B is greater than said value of the average power during said predetermined time period when only said parameters representing the climatic conditions for said generation of said operating command are taken into account.

It will be noted that in electric transport vehicles equipped with a device for the recovery of braking energy, when the parameter indicates that electrical energy is produced, the electric transport vehicle is for example in a braking phase. Thus, during the second period B, the power delivered by said at least one actuator is increased with respect to the value of the average power during the predetermined time period when only the parameters representing the climatic conditions are taken into account.

According to a feature, said at least one operating command applied to said at least one actuator comprises a control signal, during the generation of the operating command, at least one parameter of the control signal being modified as a function of the value for the parameter relating to at least one electric transport vehicle.

Thus, by modifying at least one parameter of the control signal applied to said at least one actuator, the instantaneous power delivered by the actuator is modified, while retaining the value of the average power over the predetermined time period.

According to a feature, the parameter of said control signal is an amplitude or a duration.

According to a feature, the regulating means comprise:
  a first regulating means configured in order to generate at least one intermediate operating command as a function of at least one parameter representing climatic conditions, and
  a second regulating means configured in order to modify said at least one intermediate operating command as a function of the value for the parameter relating to at least one electric transport vehicle and to generate said at least one operating command applied to said at least one actuator.

Thus, for equivalent climatic conditions, an operating command of an actuator (intermediate operating command) generated by the first regulating module can be modified such that the actuator can operate differently as a function of the value for the parameter relating to at least one electric transport vehicle.

It will be noted that the energy consumption is represented by the value for at least one parameter relating to at least one electric transport vehicle, this value being different as a function of the mode of movement of the electric transport vehicle. Thus, by taking into account the value for said at least one parameter relating to at least one electric transport vehicle, account is taken of the energy consumption of the mode of movement.

Moreover, the second regulating module can be added to a conventional air conditioning system, i.e. comprising only the first regulating module, thus making it possible to obtain an air conditioning system with optimized consumption, based on a conventional air conditioning system.

According to a feature, the air conditioning system also comprises energy storage means configured in order to store electrical energy when the value for the parameter relating to at least one electric transport vehicle indicates the production of electrical energy by said at least one electric transport vehicle.

For example, an electric transport vehicle produces energy when it is in the braking phase.

Thus, for example, when the vehicle is in the braking mode, the energy generated is stored in the storage means and can be reused later.

According to another feature, the air conditioning system also comprises load shedding means configured in order to disconnect said air conditioning system from said electrical supply network when the value for the parameter relating to at least one electric transport vehicle indicates electrical energy consumption by said at least one electric transport vehicle.

For example, an electric transport vehicle consumes energy when it is in the traction phase.

Thus, for example, when the vehicle is in traction mode, as the energy consumption in this mode is high, the electrical energy consumed by the air conditioning system is zero or reduced and the energy consumption peaks are reduced.

According to a feature, the value for the parameter relating to at least one electric transport vehicle comprises:
  a value for electrical power, or a tractive effort, or a braking force, or a distance, or a speed, or an acceleration, or a value representing an open or closed state of the doors of said at least one electric transport vehicle, or a value for a voltage of said power network supplying said at least one electric transport vehicle.

According to a feature, said at least one parameter relating to at least one electric transport vehicle relates to at least the electric transport vehicle comprising the air conditioning system.

According to a feature, said at least one parameter relating to at least one electric transport vehicle relates to at least one electric transport vehicle different from the electric transport vehicle comprising the air conditioning system.

According to another feature, said at least one parameter relating to at least one electric transport vehicle relates to several electric transport vehicles supplied by the electrical supply network.

Thus, according to different embodiments, the electric transport vehicle comprising the air conditioning system forms part of or does not form part of the several electric transport vehicles.

According to a second aspect, the invention relates to an electric transport vehicle supplied by an electrical supply network comprising an air conditioning system according to the invention, said regulating means of the air conditioning system being configured in order to generate said at least one operating command applied to said at least one actuator for the production of heat or cold as a function moreover of the value for at least one parameter relating to at least one electric transport vehicle supplied by the electrical supply network, the value for the parameter indicating that electrical energy is consumed by said at least one electric transport vehicle, or that the electrical energy is produced by said at least one electric vehicle, said at least one operating command being generated such that the average power delivered by said at least one actuator over the predetermined time period has substantially the same value as when the regulating means only take into account the parameters representing the climatic conditions.

According to a feature, the electric transport vehicle also comprises energy storage means configured in order to store electrical energy when the value for the parameter relating to said at least one electric transport vehicle indicates the production of electrical energy by said at least one electric transport vehicle.

According to a feature, the electric transport vehicle also comprises load shedding means configured in order to disconnect the air conditioning system from the electrical supply network when the value for the parameter relating to at least one electric transport vehicle indicates electrical energy consumption by said at least one electric transport vehicle.

According to a feature, said at least one parameter relating to at least one electric transport vehicle supplied by the electrical supply network relates to at least said electric transport vehicle comprising the air conditioning system.

According to a feature, said at least one parameter relating to at least one electric transport vehicle relates to at least one electric transport vehicle different from the electric transport vehicle comprising the air conditioning system.

According to a feature, said at least one parameter relating to at least one electric transport vehicle relates to several electric transport vehicles supplied by the electrical supply network.

According to a third aspect, the invention relates to a method for regulating parameters representing climatic conditions to predefined values in an electric transport vehicle supplied by an electrical supply network, comprising generating at least one operating command applied to at least one actuator for the production of heat or cold of an air conditioning system as a function of values for parameters representing the climatic conditions, said at least one actuator delivering an average power over a predetermined time period.

According to the invention, the generation of said at least one operating command applied to said at least one actuator also takes into account the value for a parameter relating to at least one electric transport vehicle supplied by the electrical supply network, the value for the parameter indicating that the electrical energy is consumed by said at least one electric transport vehicle, or that electrical energy is produced by said at least one electric vehicle, said at least one operating command being generated such that the average power delivered by said at least one actuator over the predetermined time period has substantially the same value as when the generation takes into account only the parameters representing the climatic conditions.

According to a feature, over the predetermined time period, said at least one operating command is generated such that if during a first period A in which the value for said at least one parameter indicates that electrical energy is consumed by said at least one electric transport vehicle, the average power delivered by said at least one actuator during said first period A is less than the value of the average power during the predetermined time period when only the parameters representing climatic conditions are taken into account for generating said at least one operating command.

According to a feature, over the predetermined time period, said at least one operating command is generated such that if during a second period B the value for said at least one parameter indicates that electrical energy is produced by said at least one electric transport vehicle, the average power delivered by said at least one actuator during the second period B is greater than the value of the average power during the predetermined time period when only the parameters representing the climatic conditions are taken into account for the generation of the operating command.

According to a feature, said at least one operating command applied to said at least one actuator comprises a control signal, during the generation of the operating command applied to said at least one actuator, at least one parameter of the control signal being modified as a function of the value for the representative parameter of an electric transport vehicle.

According to a feature, the parameter of said control signal is an amplitude or a duration.

According to a feature, the generation comprises:
generating at least one intermediate operating command as a function of at least one parameter representing climatic conditions, and
modifying said at least one intermediate operating command as a function of the value for the parameter relating to at least one electric transport vehicle in order to generate said at least one operating command applied to said at least one actuator.

According to a feature, the regulating method also comprises generating a control signal for the storage of electrical energy when the value for the parameter relating to at least one electric transport vehicle indicates the production of electrical energy by said at least one electric transport vehicle.

According to a feature, the regulating method also comprises generating a control signal for disconnecting the air conditioning system from an electrical supply network when the value for the parameter relating to at least one electric transport vehicle indicates electrical energy consumption by said at least one electric transport vehicle.

The electric transport vehicle and the method for regulating the parameters representing climatic conditions to predefined values in an electric transport vehicle have features and advantages similar to those described previously in relation to the air conditioning system.

Other features and advantages of the invention will become more apparent in the following description.

BRIEF DESCRIPTION OF THE DRAWINGS

In the attached drawings, given by way of non-limitative examples.

DESCRIPTION OF THE PREFERRED EMBODIMENTS

Figure 1:
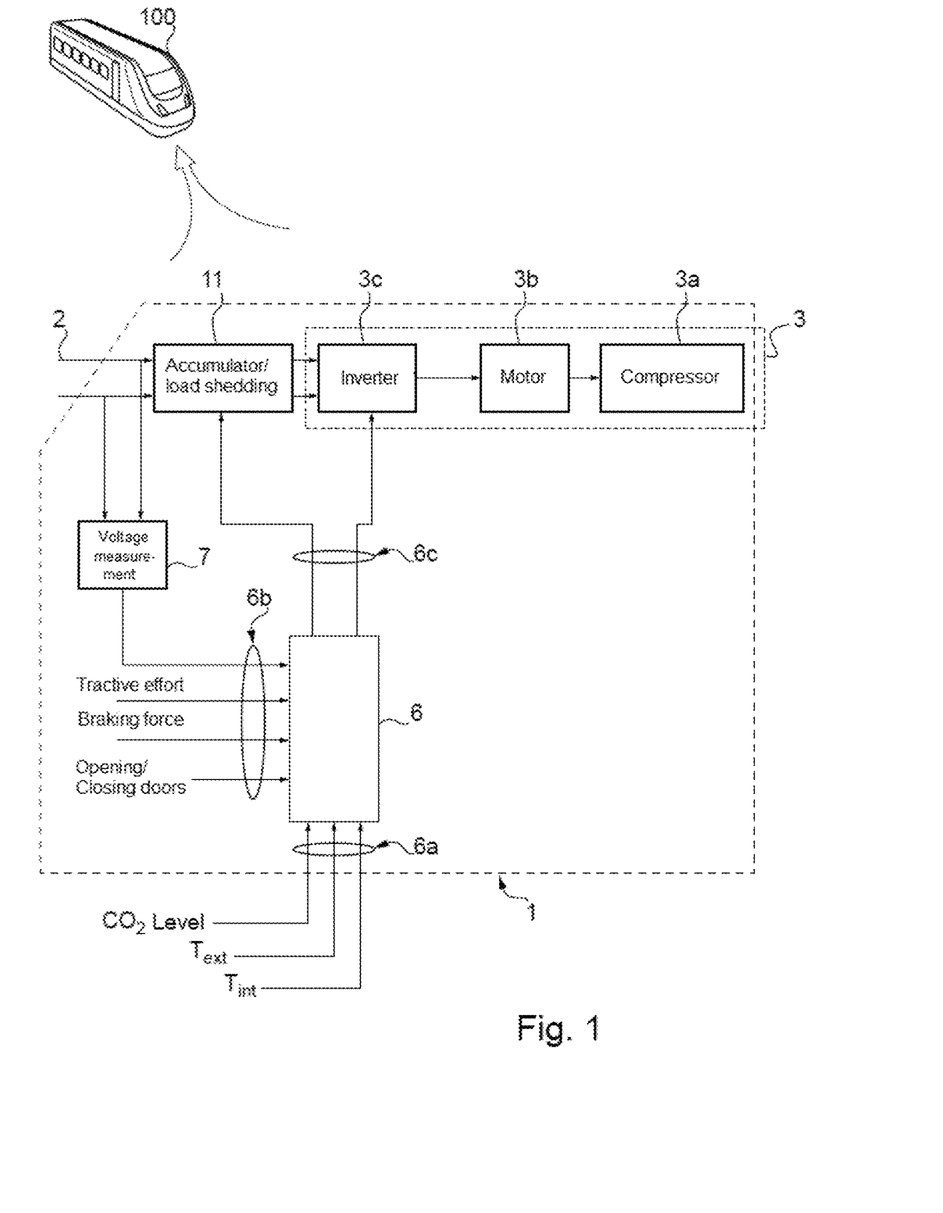
FIG. 1 shows diagrammatically an air conditioning system according to a first embodiment of the invention.

FIG. 1 shows an air conditioning system according to a first embodiment of the invention.

The invention relates particularly to urban electric transport vehicles, such as for example underground trains or trams, trolleybuses, etc.

The air conditioning system 1 is mounted in an electric transport vehicle 100. The electric transport vehicle 100 is supplied by an electrical supply network 2.

The air conditioning system 1 comprises at least one actuator such as a compressor, fans, heating resistances, etc.

In FIG. 1, only one actuator 3 is shown, in order to simplify the figure. In this example shown, the actuator itself is a compressor 3a, the operation of the compressor 3a being controlled by a motor 3b, the motor 3b being supplied by a variable-frequency inverter 3c.

It will be noted that the actuator 3 produces heat or cold (for example in air conditioning systems known as "reversible").

The air conditioning system 1 also comprises regulating means 6 configured in order to generate operating commands of the actuators 6c, such as a command controlling the speed of the motor 3b controlling the compressor 3a.

Of course, the operating commands of the actuators 6c comprise other commands not shown in the figures, such as commands controlling the speed of the fans, the connection or disconnection of the heating resistances, etc.

Thus, the operating commands of the actuators 6c are output signals of the regulating means 6.

The regulating means 6 receive at the input a first set of parameters representing the climatic conditions 6a and a second set of parameters relating to at least one electric transport vehicle 6b. The value for the parameter indicates if the electrical energy is consumed by said at least one electric transport vehicle, or if the electrical energy is produced by said at least one electric transport vehicle.

It will be noted that said at least one parameter relating to at least one electric transport vehicle 6b can relate to the electric transport vehicle on which the air conditioning system 1 is mounted, to a second electric transport vehicle supplied by the same electrical supply network 2, or to several electric transport vehicles supplied by the same electrical supply network 2.

The value for the parameter relating to at least one electric transport vehicle 6b is a function for example of actions relating to the driving of the vehicle. An action relating to the driving of a vehicle can be traction or electrical braking. Thus, a parameter representing a driving-related action can be a tractive effort or an electrical braking effort, its value representing respectively the level of tractive effort or electrical braking effort.

Thus, for example, the value for the parameter relating to at least one electric transport vehicle can be:

a value for electrical power, or a tractive force, or a braking force, or a distance, or a speed, or an acceleration, or a value representing a state of opening or closing of the doors of said at least one electric transport vehicle, (the opening and the closing of the doors being controlled when the vehicle is stopped), or a value for a voltage of said electrical supply network 2 supplying said at least one electric transport vehicle.

It will be noted that when an electric transport vehicle equipped with a device for the recovery of braking energy, supplied by an electrical supply network brakes by means of its traction motors (the driving-related action being a braking action), the voltage over the electrical supply network increases if the electric transport vehicle is designed such that the electrical energy produced by its motors is sent over the electrical supply network 2.

In contrast, when at least one electric transport vehicle supplied by the electrical supply network 2 exerts a tractive effort (the driving-related action being traction), the value for the voltage of the electrical supply network increases.

In the embodiment shown, the parameters relating to at least one vehicle 6b comprise a tractive effort, a braking effort, a value representing an open or closed state of the doors, and the measured voltage of the electrical supply network 2.

In the embodiment shown, the set of parameters representing the climatic conditions 6a comprises the temperature in the interior and on the exterior of the vehicle, and the $CO_2$ level. These parameters are standard parameters in an air conditioning system. Other parameters may be used, such as humidity.

The regulating means 6 are configured in order to generate the operating commands 6c applied to the actuators as a function of the values of the parameters representing climatic conditions 6b as well as the value for a parameter relating to at least one electric transport vehicle supplied by the electrical supply network 2, the value for the parameter indicating that electrical energy is consumed by said at least one electric transport vehicle or that electrical energy is produced by said at least one electric transport vehicle.

Thus, the operating commands 6c applied to the actuators 3 are generated such that at least one of the parameters representing the climatic conditions is maintained at a predefined value while taking into account the value for at least one parameter relating to at least one electric transport vehicle 6b supplied by the electrical supply network 2.

As will be described below, said at least one operating command applied to said at least one actuator 3 is generated such that the average power delivered by said at least one actuator 3 over a predetermined time period has substantially the same value as when the regulating means 6 only take into account said parameters representing the climatic conditions 6a.

In the embodiment depicted in FIG. 1, the air conditioning system also comprises means for measuring the voltage 7 of the electrical supply network 2, so as to generate, at the input of the regulating means 6, a value for a parameter relating to at least one electric transport vehicle supplied by the electrical supply network 2.

Figure 2:
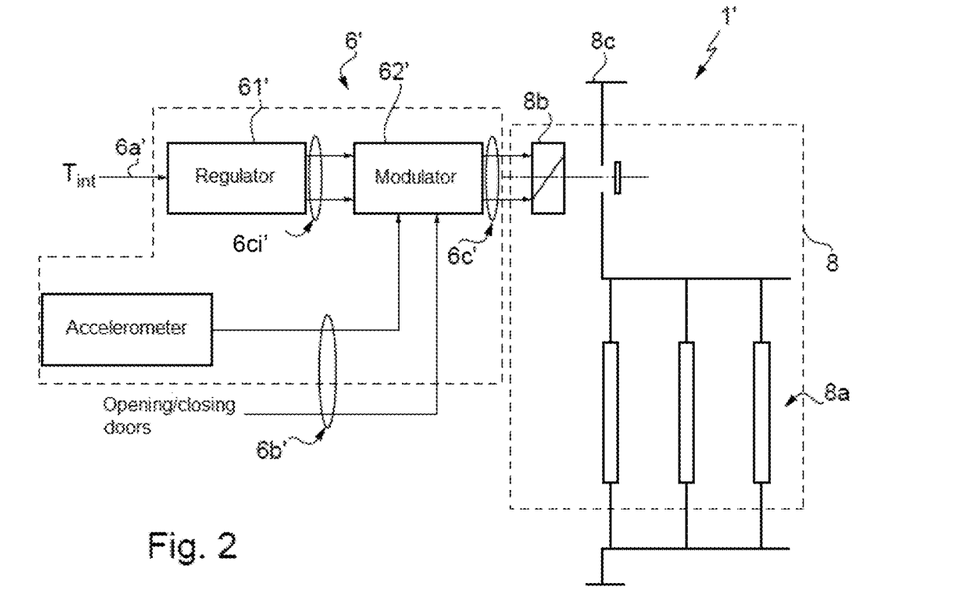
FIG. 2 shows a diagram representing an air conditioning system according to a second embodiment of the invention.

FIG. 2 shows a second embodiment of an air conditioning system for an electric transport vehicle.

As will be explained, this embodiment is suitable for adapting a conventional air conditioning system so as to obtain an air conditioning system 1' according to the invention.

As for the embodiment represented by FIG. 1, a single actuator 8 is shown, in order to simplify the figure.

In the embodiment shown, the actuator itself is a set of heating resistances 8a, these heating resistances being actuators producing heat.

The set of heating resistances 8a is connected to a contactor 8b. The contactor 8b makes it possible to connect or not connect the set of heating resistances 8a to a supply 8c.

The contactor 8b is controlled by operating commands 6c.

Of course, the air conditioning system 1' comprises other actuators, not shown in the figure.

In an embodiment, the regulating means 6' comprise in an embodiment a first regulating module 61' and a second regulating module 62'.

The first regulating module 61' is configured in order to generate intermediate operating commands 6ci' of the actuators as a function of at least one parameter representing the climatic conditions 6a'.

In the embodiment shown, a parameter representing the climatic conditions 6a' is the temperature in the interior of the vehicle. Thus, the first regulating module 61' generates at the output intermediate operating commands 6ci' of the actuators as a function of the temperature in the interior of the vehicle in which the air conditioning system 1' is mounted.

The second regulating module 62' is configured in order to modify the intermediate operating commands 6ci' applied to the actuators 8 as a function of the value for at least one parameter relating to at least one electric transport vehicle 6b' and in order to generate said at least one operating command 6c' applied to said at least one actuator 8.

In other words, the intermediate operating commands 6ci' of the actuators 8 are modulated as a function of the value for at least one parameter relating to at least one electric transport vehicle 6b', so as to generate at the output operating commands 6c' applied to the actuators 8 or operating commands 6c' applied to the modulated actuators.

The second regulating module 62' comprises at the input the intermediate operating commands 6ci' applied to the actuators 8, as a function of the value for at least one parameter relating to at least one electric transport vehicle 6b'.

In the embodiment shown, the parameters relating to at least one electric transport vehicle 6b' are an acceleration of the vehicle and a value representing an open or closed state of the doors. The acceleration of the vehicle originates from an accelerometer. It will be noted that the acceleration information originating from an accelerometer does not make it possible to know whether the electric transport vehicle is braking or accelerating when this vehicle can move in either direction, i.e. it has a driver's cab at each end.

Thus, the additional information relating to the opening or closing of the doors makes it possible for the second regulating module 62' to know whether the vehicle is accelerating or braking, as the vehicle can only accelerate after the doors have been closed.

In this embodiment, the first regulating module 61' is configured in order to generate intermediate operating commands 6ci' applied to the actuators 8 as a function of the temperature in the interior of the vehicle in which the air conditioning system 1' is installed, and the second regulating module 62' is configured in order to modify the intermediate operating commands 6ci' applied to the actuators 8 as a function of the values of the parameters relating to an electric transport vehicle 6b', the values being an acceleration of the vehicle in which the air conditioning system 1' is installed and a value representing an open or closed state of the doors of the electric transport vehicle.

In the embodiment shown, the operating commands applied to the actuators 6c' control the connection or the disconnection of the heating resistances 8a to a supply 8c by means of a contactor 8b.

The air conditioning system according to the invention 1, 1' implements a method for regulating the parameters representing climatic conditions to predefined values in an electric transport vehicle.

Figure 3:
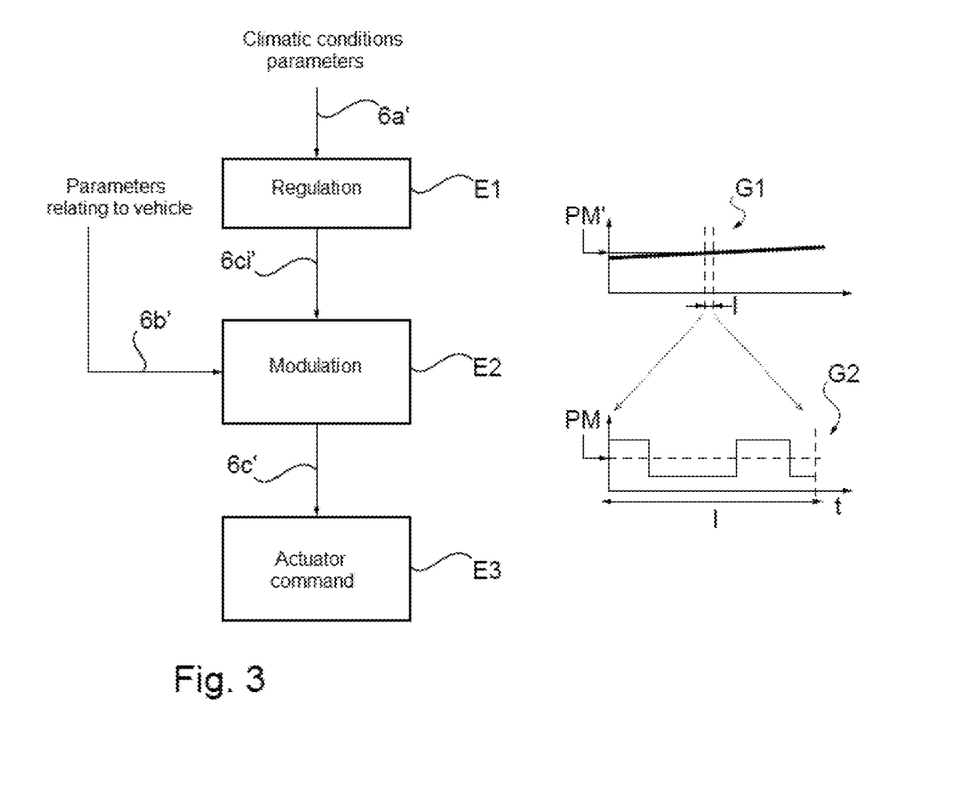
FIG. 3 shows diagrammatically a regulating method according to an embodiment of the invention.

A method for regulating the parameters representing climatic conditions to predefined values according to an embodiment is shown in FIG. 3. The method comprises generating E1 at least one operating command applied to said at least one actuator 3, 8 of an air conditioning system as a function of values for parameters representing the climatic conditions 6a, 6a', said at least one actuator 3, 8 delivering an average power over a predetermined time period I.

Generating E2, E3 said at least one operating command applied to said at least one actuator also takes into account the value for a parameter relating to at least one electric transport vehicle 6b, 6b' supplied by said electrical supply network 2. The value for the parameter indicates that the electrical energy is consumed by said at least one electric transport vehicle, or that electrical energy is produced by said at least one electric vehicle.

Said at least one operating command 6c, 6c' is generated such that the average power PM delivered by said at least one actuator 3, 8 over said predetermined time period has substantially the same value PM' as when the regulating means 6, 6' only take into account the parameters representing the climatic conditions.

In the mode shown in FIG. 3, the method corresponds to an air conditioning system represented by FIG. 2, i.e. with the regulating means comprising first regulating means 61' and second regulating means 62'.

It will thus be noted that steps E1 and E2 are grouped together in a single step for the embodiment shown in FIG. 1.

The method shown comprises a step E1 of generating intermediate operating commands 6ci' of the actuators as a function of at least one parameter representing climatic conditions 6a'.

This generating step E1 corresponds to a conventional climatic regulation.

The method also comprises a step E2 of modifying intermediate operating commands 6ci' of the actuators generated in the generation step E1, this modification being implemented as a function of the value for at least one parameter relating to at least one electric transport vehicle 6b' such that, over a predetermined time period, the average power PM delivered by at least one actuator 8 has substantially the same value PM' as when the intermediate operating commands 6ci' are sent directly to the actuators so as to control their operation, taking into account only the parameters representing the climatic conditions 6a'. Operating commands applied to the actuators 6c' are thus generated at the output of modification step E2.

The operating commands of the actuators 6c' are sent to the actuators 8 so as to control their operation during a step of controlling the actuators E3.

Each operating command of an actuator 6c' comprises a control signal representing a value. The control signal can be for example an electrical signal, such as an analogue, digital or logic signal.

During the modification E2 of said operating command, at least one parameter of said control signal is modified as a function of said value for said representative parameter of an electric transport vehicle.

For example, the parameter of the control signal is an amplitude or a duration.

FIG. 3 shows graphs representing a control signal. A first graph G1 represents a control signal or intermediate operating command 6ci' indicating the power to be delivered by an actuator 8. During the generation step E1, a control signal to be applied to an actuator 8 is generated, the actuator 8 delivering an average power PM' over a predetermined time period I.

A second graph G2 represents the control signal or operating command 6c' applied to an actuator 8 indicating the power to be delivered by an actuator 8.

During the modification step E2, the control signal generated during the generating step E1 is modified and generated such that the average power PM over the predetermined time period I is substantially identical to the value for an average power PM' of the control signal generated during the generating step E1.

Figure 4:
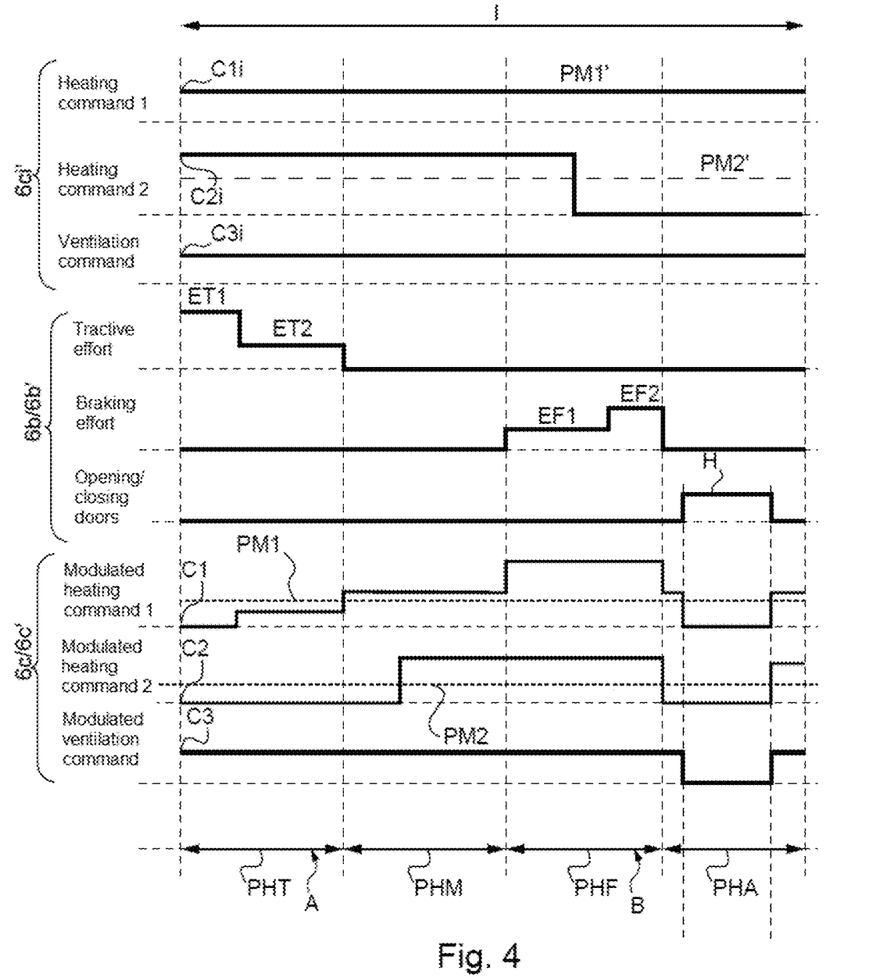
FIGS. 4 and 5 show control signals over time generated by air conditioning systems according to embodiments of the invention.
Figure 5:
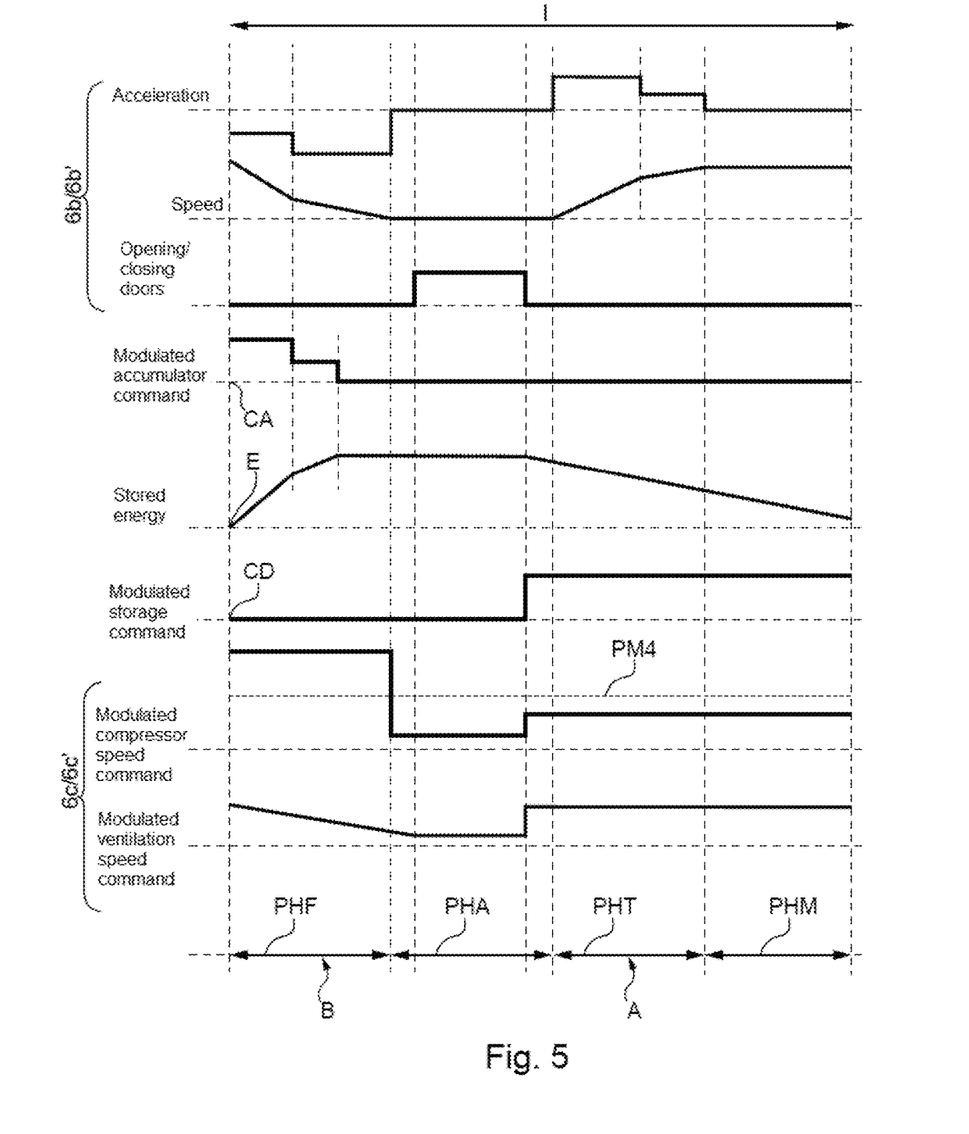

FIGS. 4 and 5 show the development over time of the operating commands 6c, 6c' of the actuators 3, 8 generated in the air conditioning systems 1, 1' according to two different embodiments.

FIG. 4 shows a first group of signals representing intermediate operating commands 6ci' of the actuators generated as a function of at least one parameter representing climatic conditions 6a, 6a'. Here, the parameter representing climatic conditions is the temperature in the interior of a passenger compartment of the electric transport vehicle, and the actuators producing heat comprise heating resistances 8.

FIG. 4 shows two types of operating command of the heating resistances. A first operating command of the heating resistances is represented by a control signal C1 representing a heating power value.

A second operating command of the heating resistances is represented by a second control signal C2, this control signal being a logic signal, i.e. as a function of the level or state of this control signal 2, the heating resistances are connected to the supply voltage 2, or they are disconnected from the supply voltage. In the embodiment shown, the control signal C2 is capable of representing only 2 heating power values (full power, zero power).

A third control signal C3 represents the operating command of the fans. In this example, the signal is a logic signal.

The control signals have been shown as a function of time t. The driving of the vehicle (not shown) develops as a function of time t; several driving phases are represented. During a driving phase, actions relating to the driving of the vehicle are implemented.

It will be noted that as a function of the action relating to the driving of the vehicle, the electric transport vehicle consumes or produces electrical energy.

Thus, a traction phase PHT, a freewheeling phase PHM, a braking phase PHF and a stop phase PHA are shown.

In the example shown, these phases form a predetermined time period I. Of course, in the predetermined time period I, the number of each of these phases and their order may be different.

In FIG. 4, four actions relating to the driving of the vehicle are shown, a first action being traction (traction phase PHT), a second action being freewheeling (freewheeling phase PHM), a third action being braking (braking phase PHF), and a fourth action being stopping (stop phase PHA).

The values for parameters relating to at least one electric transport vehicle are a function of the phase in which the electric transport vehicle is situated.

In the embodiment shown, a value for a tractive force, an electric braking force, and a value representing an open or closed state of the doors are represented.

Of course, other parameters relating to at least one electric transport vehicle can be taken into account. These parameters can comprise:

a value for electrical power, or a tractive force, or a braking force, or a distance, or a speed, or an acceleration, or a value representing an open or closed state of the doors of an electric transport vehicle, or a value for a voltage of the power network supplying at least one electric transport vehicle.

Thus, as shown in FIG. 4, the value for the tractive force or effort has a first value ET1 (for example 100% of the maximum value) and a second value ET2 (for example 50%) during the traction phase PHT, the value for these parameters being zero during the other phases represented.

Similarly, the value for the force or the braking effort has a first value EF1 (for example 50%) and a second value EF2 (for example 100%) during the braking phase, the value for the electrical braking effort being zero during the other driving phases represented.

As the value representing the opening or closing of the doors is a binary logic signal, it has a low level when opening of the doors is not commanded or the doors are closed (this being the case during the phases of traction PHT, freewheeling PHM and braking PHF) and a high level H representing the opening of the doors (opening of the doors being commanded when the vehicle is stopped).

For example, the value for the parameter relating to at least one electric transport vehicle 6b' indicates that electrical energy is consumed during the traction phase PHT or first period A and indicates that energy is produced during the braking phase PHF or second phase B.

During the stop phase PHA or freewheeling phase PHM, energy is neither consumed nor produced.

FIG. 4 shows a third group comprising operating commands of the actuators 6c'. These commands 6c' are generated in the modification step E2 of the regulating method. A first operating command C1 is generated by modifying the operating command of the heating resistance C1i (intermediate operating command). A second operating command of the heating module C2 is generated by modifying the operating command of the heating module C2i (intermediate operating command). A third operating command of the ventilation module C3 is generated by modifying the operating command of the ventilation module C3i (intermediate operating command).

The operating commands are represented by command signals C1, C2, C3.

The value for each control signal C1, C2 represents a power set point or power value delivered by the actuator 3, 8. It is such that the value of the average power set point value PM1, PM2 represented by this signal over a predetermined time period I is substantially equal to the value of the average power set point or average power delivered by the actuator PM1', PM2' of the intermediate control signal C1$i$, C2$i$ generated by the first regulating module (shown in FIG. 2).

In an air conditioning system such as that shown in FIG. 1, the regulating means 6 send a speed value 6$c$ (the control signal being a speed) to the inverter 3$c$.

The inverter 3$c$ delivers, as a function of the speed value 6$c$ received, power control signals of the motor 3$b$ so that it can run at the required speed. The motor 3$b$, running at the requested speed, drives the compressor 3$a$, the compressor 3$a$ thus delivering a given power value.

As a result, the value for each control signal 6$c$ represents a power set point or power value delivered by the actuator 3.

For example, the values for PM1 and PM1' are 40% of the maximum value and those for PM2 and PM2' are 60%.

Of course, these values can have different values.

In this embodiment, the predetermined time period I corresponds to the sum of the time periods associated with each of the driving phases corresponding to a journey between two stations.

By way of non-limitative example, the traction phase PHT, freewheeling phase PHM, braking phase PHF and stop phase PHA have the same duration of 30 s.

Of course, this duration value can be different and the durations of the phases can be different from each other.

Thus, during the traction phase PHT, the control signal of the heating module C1 is generated from the first intermediate control signal C1$i$, of the heating module, this intermediate control signal C1$i$ being modulated by the value for the tractive effort in this example.

It will be noted that the value for the tractive effort is a value for a parameter relating to an electric transport vehicle.

Thus, when the tractive effort has its maximum value ET1, the control signal of the heating resistance C1 or modulated control signal of the heating resistance C1 has a zero value, and when the value for the tractive effort has the second value ET2, the modulated control signal C1 has a value greater than 0 and less than the average power set point value PM1' over the predetermined time period I.

During the freewheeling phase PHM in which the value for the tractive effort is zero, the value represented by the modulated control signal C1 has a value greater than the value of the average power set point PM1 over the predetermined time period I. During the braking phase, during which the tractive effort is zero, the value for the modulated control signal C1 has its upper value, this value reducing when the vehicle is stopped, and being zero when the command for opening the doors is activated.

The average value PM1 of the control signal C1 representing the operating command of the heating is substantially equal to the value of the average power set point PM1' of the intermediate control signal C1$i$ of the heating generated by the first regulating module 61' over the predetermined time period I.

The second modulated control signal of the heating C2 is modified with respect to the second intermediate heating control signal C2$i$ such that it has a low level during the traction phase PHT and a part of the stop phase PHA and the freewheeling phase PHM and a high level during the braking phase PHF as well as during a part of the freewheeling phase PHM and during the stop phase PHA after the closing of the doors.

The value of the average power set point PM2 of the control signal C2 representing the operating command of the heating is substantially equal to the average value PM2' of the intermediate control signal C2$i$ of the heating generated by the first regulating module over the predetermined time period I.

As a result, when the parameters relating to at least one electric transport vehicle 6$b$' have a value indicating the consumption of electrical energy (due for example to the traction of the vehicle), the second regulating module 62' is configured in order to inhibit at least one of the operating commands 6$ci$' of the actuators generated by the first regulating module 61 or to reduce the value of the signal representing the operating command.

On the other hand, when the parameters relating to at least one electric transport vehicle have a value indicating the production of electrical energy (due for example to braking of the vehicle), the second regulating module 62' is configured in order not to modify the operating commands 6$ci$' generated by the first regulating module 61' or to increase the value of the control signal representing the operating command.

In order to reduce heat losses when the doors of the electric transport vehicle are open, the modulated ventilation control signal C3 has a high level throughout the predetermined time period I except when the door opening command is given.

FIG. 5 shows control signals according to another embodiment. A first group of signals representing the value for the parameters relating to at least one electric transport vehicle 6$b$ is shown. In this example, the parameters are the acceleration of the vehicle, the speed of the vehicle, as well as a value representing an open or closed state of the doors.

A second group of control signals 6$c$, 6$c$' comprises an operating command of the compressor or modulated control signal of the compressor, and the operating command of the ventilator or modulated control signal of the ventilator.

A third group of signals comprises a control signal CA of the energy storage means, a signal E representing the energy stored in the energy storage means, and a third signal CD representing a control signal of the load shedding means.

The values of the control signals shown change over time t.

In this embodiment, a first braking phase PHF is shown, followed by a stop phase PHA, a traction phase PHT and a freewheeling phase PHM.

As for FIG. 4, the order and the duration of the phases may be different from those shown.

The values of the parameters relating to at least one electric transport vehicle 6$b$ vary as a function of the driving phase of the vehicle. These values are taken into account when the modulated control signals are generated.

For example, the value for the parameter relating to at least one electric transport vehicle 6$b$ indicates that electrical energy is consumed during the traction phase PHT or first period A and indicates that energy is produced during the braking phase PHF or second phase B.

Of course, the predetermined time period I can comprise several first periods A or several second periods B.

During the stop phase PHA or freewheeling phase PHM, energy is neither consumed nor produced.

Thus, as shown in FIG. 5, the modulated control signal of the compressor (representing the operating command of the compressor) has a first value during the braking phase, a second value (less than the first value) during the stop phase and a third value (greater than the first value and less than the second value) during the traction phase PHT and the freewheeling phase PHM. These values are determined such that the value of the average power set point or value of the average power PM4 delivered by the compressor during the predetermined time period I is substantially equal to the average value for a control signal (not shown) generated, only taking into account the parameters representing the climatic conditions.

In the example shown in FIG. 5, in order to reduce heat losses when the doors are open, the modulated control signal of the ventilator has values reducing during the braking phase PHF to a minimum ventilation value when the doors are open during the stop phase PHA, and a return to the normal ventilation value during the traction phase PHT and freewheeling phase PHM.

In an embodiment (FIG. 1), the air conditioning system also comprises energy storage means 11 configured in order to store electrical energy from the electrical supply network 2 as a function of the value for the parameter relating to at least one electric transport vehicle or electric transport vehicles supplied by the same electrical supply network 2.

In other embodiments, the energy storage means and/or the load shedding means are situated in the electric transport vehicle outside the air conditioning system 1, 1'.

The air conditioning system can also comprise load shedding means 11 configured in order to disconnect the air conditioning system 1, 1' from the electrical supply network 2.

In this embodiment, the regulating method comprises generating a control signal CA for the storage of electrical energy from the electrical supply network 2 as a function of the value for the parameter relating to at least one electric transport vehicle.

The method can also comprise generating a command for the disconnection of the air conditioning system 1, 1' from the electrical supply network 2.

The control signal for the electrical energy storage CA shown in FIG. 5 has values that take into account the value for the parameters representing an action relating to the driving of the vehicle. Thus, during the braking phase PHF, the control signal for the energy storage CA has positive values indicating the activation of the energy storage the height of which matches those for deceleration. Once the full charge is reached or the vehicle passes into the stop phase PHA, the control signal for the electrical energy storage CA has a zero value, deactivating the energy storage.

The energy curve E represents an increase in energy stored in the storage means during the braking phase PHF, the energy remaining stable during the stop phase PHA, and reducing during the phases of traction PHT and freewheeling PHM.

The control signal CD for disconnecting the air conditioning system 1, 1' from the electrical supply network has a level of zero when the vehicle is in a braking phase PHF and in a stop phase PHA until the doors are closed. Thus, the air conditioning system is supplied by the electrical supply network 2. The disconnection control signal CD has a high level as from closure of the doors in the stop phase PHA and when the vehicle is in a traction phase PHT or in a freewheeling phase PHM. From then on, the air conditioning system is no longer supplied by the electrical supply network 2 but by the storage means.

It will be noted that in an embodiment, a parameter relating to at least one electric transport vehicle relates to at least the electric transport vehicle comprising the air conditioning system.

In another embodiment, a parameter relating to at least one electric transport vehicle relates to at least one electric transport vehicle different from the electric transport vehicle comprising the air conditioning system.

In this embodiment, the parameter relating to at least one electric transport vehicle relates to several electric transport vehicles supplied by the electrical supply network.

The invention claimed is:

1. An air conditioning system for an electric transport vehicle supplied by an electrical supply network (2), the air conditioning system comprising:
    at least one actuator for the production of heat or cold, said at least one actuator configured to deliver an average power over a predetermined time period; and
    regulating means comprising a regulator and a modulator,
    the regulator (61') configured to generate an intermediate operating command (6ci') as a function of values for climate parameters representing climatic conditions, and
    the modulator (62') configured to receive at an input thereof said intermediate operating command (6ci') and a value for a vehicle parameter relating to at least one electric transport vehicle supplied by said electrical supply network, said value for said vehicle parameter indicating that the electrical energy is consumed by said at least one electric transport vehicle or that electrical energy is produced by said at least one electric vehicle, said modulator modifying said intermediate operating command (6ci') and generating an operating command (6c') applied to said at least one actuator as a function of said value for said vehicle parameter, said operating command (6c') being generated such that the average power delivered by said at least one actuator over said predetermined time period (I) has a same value as when said intermediate operating command (6ci') is sent directly to said at least one actuator, only taking into account said climate parameters representing climatic conditions.

2. The air conditioning system according to claim 1, wherein over the predetermined time period (I) said operating command is generated such that if during a period A in which the value for said vehicle parameter indicates that the electrical energy is consumed by said at least one electric transport vehicle, the average power delivered by said at least one actuator during said period A is less than a value of the average power during said predetermined time period (I), when only said climate parameters representing climatic conditions are taken into account for said generation of said operating command.

3. The air conditioning system according to claim 1, wherein over the predetermined time period (I) said operating command is generated such that if during a period B the value for said vehicle parameter indicates that electrical energy is produced by said at least one electric transport vehicle, the average power delivered by said at least one actuator during said period B is greater than a value of the average power during said predetermined time period (I) when only said climate parameters are taken into account for said generation of said operating command.

4. The air conditioning system according to claim 1, wherein said operating command applied to said at least one actuator comprises a control signal, and during the generation of said operating command, at least one parameter of said control signal is modified as a function of said value for said vehicle parameter relating to the at least one electric transport vehicle.

5. The air conditioning system according to claim 4, wherein said at least one parameter of said control signal is one of an amplitude and a duration.

6. The air conditioning system according to claim 1, further comprising:
energy storage means (11) configured to store electrical energy when the value for said vehicle parameter indicates production of electrical energy by said at least one electric transport vehicle.

7. The air conditioning system according to claim 1, further comprising:
a disconnector (11) configured to disconnect said air conditioning system (1) from said electrical supply network (2) when the value for said vehicle parameter indicates electrical energy consumption by said at least one electric transport vehicle.

8. The air conditioning system according to claim 1, wherein said value for said vehicle parameter comprises:
a value for electrical power, or a tractive force, or a braking force, or a distance, or a speed, or an acceleration, or
a value representing an open or closed state of the doors of said at least one electric transport vehicle, or
a value for a voltage of said power network supplying said at least one electric transport vehicle.

9. The air conditioning system according to claim 1, wherein said at least one vehicle parameter relates to at least said electric transport vehicle comprising said air conditioning system.

10. The air conditioning system according to claim 1, wherein said at least one vehicle parameter relates to at least one electric transport vehicle different from said electric transport vehicle comprising said air conditioning system.

11. The air conditioning system according to claim 1, wherein said at least one vehicle parameter relates to several electric transport vehicles supplied by said electrical supply network (2).

12. An electric transport vehicle supplied by an electrical supply network (2), comprising an air conditioning system (1, 1') according to claim 1.

13. The electric transport vehicle according to claim 12, further comprising energy storage means (11) configured to store electrical energy, when the value for the vehicle parameter indicates production of electrical energy by said at least one electric transport vehicle.

14. The electric transport vehicle according to claim 12, further comprising a disconnector (11) configured to disconnect said air conditioning system (1, 1') from said electrical supply network (2) when the value for the vehicle parameter indicates electrical energy consumption by said at least one electric transport vehicle.

15. The electric transport vehicle according to claim 12, wherein said vehicle parameter relates to at least said electric transport vehicle comprising said air conditioning system (1, 1').

16. The electric transport vehicle according to claim 12, wherein said vehicle parameter relates to at least one electric transport vehicle different from said electric transport vehicle comprising said air conditioning system (1, 1').

17. The electric transport vehicle according to claim 12, wherein said at least one vehicle parameter relates to several electric transport vehicles supplied by said electrical supply network (2).

18. A method for regulating climate parameters representing climatic conditions to predefined values in an electric transport vehicle supplied by an electrical supply network (2), comprising:
generating an operating command to at least one actuator for the production of heat or cold of an air conditioning system (1) as a function of values for the climate parameters, said at least one actuator delivering an average power over a predetermined time period (I),
wherein said generating comprises:
generating (E1) at least one intermediate operating command as a function of at least one parameter of the climate parameters, and
modifying (E2) said at least one intermediate operating command as a function of a value for a vehicle parameter relating to at least one electric transport vehicle supplied by said electrical supply network (2), in order to generate said operating command applied to said at least one actuator,
said value for said vehicle parameter indicating that electrical energy is consumed by said at least one electric transport vehicle or that electrical energy is produced by said at least one electric vehicle, said operating command being generated such that the average power delivered by said at least one actuator (3) over said predetermined time period (I) has a same value as when, during said generation (6), only said climate parameters are taken into account.

19. The method according to claim 18, wherein over the predetermined time period (I) said operating command is generated such that if during a period A in which the value for said vehicle parameter indicates that electrical energy is consumed by said at least one electric transport vehicle, the average power delivered by said at least one actuator during said period A is less than a value of the average power during said predetermined time period (I) when only said climate parameters are taken into account for said generation (E1) of said operating command.

20. The method according to claim 18, wherein over the predetermined time period (I) said operating command is generated such that if during a period B the value for said vehicle parameter indicates that electrical energy is produced by said at least one electric transport vehicle, the average power delivered by said at least one actuator during said period B is greater than a value of the average power during said predetermined time period (I) when only said climate parameters are taken into account for said generation (E1) of said operating command.

21. The method according to claim 18,
wherein said operating command applied to said at least one actuator comprises a control signal, and
wherein during the generation of said operating command applied to said at least one actuator, at least one control parameter of said control signal is modified as a function of said value for said vehicle parameter.

22. The method according to claim 21, wherein said at least one control parameter of said control signal is one of an amplitude or a duration.

23. The method according to claim 18, further comprising:
generating a control signal for storage of electrical energy (CA) when the value for the vehicle parameter indicates the production of electrical energy by said at least one electric transport vehicle.

24. The method according to claim 18, further comprising:
generating a control signal (CD) for disconnection of said air conditioning system (1) from an electrical supply network (2) when the value for the vehicle parameter indicates electrical energy consumption by said at least one electric transport vehicle.

25. The method according to claim 18, wherein said value for said vehicle parameter comprises:

a value for electrical power, or a tractive force, or a braking force, or a distance, or a speed, or an acceleration, or a value representing an open or closed state of the doors of said at least one electric transport vehicle, or a value for a voltage of a power network supplying said at least one electric transport vehicle.

\* \* \* \* \*